US008799061B1

(12) United States Patent
Chatterjee et al.

(10) Patent No.: US 8,799,061 B1
(45) Date of Patent: Aug. 5, 2014

(54) CLASSIFYING USERS FOR AD TARGETING

(75) Inventors: Surojit Chatterjee, Fremont, CA (US);
Terry Van Belle, Sunnyvale, CA (US);
Anshul Kothari, Sunnyvale, CA (US);
Jian Zhou, Milpitas, CA (US)

(73) Assignee: Google Inc., Mountain View, CA (US)

( * ) Notice: Subject to any disclaimer, the term of this patent is extended or adjusted under 35 U.S.C. 154(b) by 528 days.

(21) Appl. No.: 12/767,617

(22) Filed: Apr. 26, 2010

(51) Int. Cl.
*G06Q 30/00* (2012.01)
*G06Q 90/00* (2006.01)
(52) U.S. Cl.
CPC ..................................... *G06Q 90/00* (2013.01)
USPC ........................................................ 705/14.1
(58) Field of Classification Search
CPC ...................................................... G06Q 90/00

USPC ......................................................... 705/14.1
See application file for complete search history.

(56) References Cited

U.S. PATENT DOCUMENTS

2008/0214156 A1\* 9/2008 Ramer et al. ............... 455/414.1

\* cited by examiner

*Primary Examiner* — Daniel Lastra
(74) *Attorney, Agent, or Firm* — McDermott Will & Emery LLP

(57) ABSTRACT

This specification describes technologies relating to content presentation. In general, one aspect of the subject matter described in this specification can be embodied in methods that include the actions of determining a location history for a user, where the location history includes a plurality of location data points for the user; analyzing the location history to derive a category for the user; associating the user with the category; and using the user's associated category to boost one or more candidate content items for delivery to the user.

43 Claims, 7 Drawing Sheets

| | | |
|---|---|---|
| 400 → | Home | Address1 | 402 |
| | Work | Address2 | 404 |
| | Vacation | GPS Coords1 | 406 |
| | Other | | 408 |

FIG. 4A

| Timestamp (424) | Location (426) | |
|---|---|---|
| t1 | x1, y1 | 422 |
| t2 | x2, y2 | 422 |
| t3 | x3, y3 | 422 |
| ... | ... | 422 |

CLASSIFYING USERS FOR AD TARGETING

BACKGROUND

The present disclosure relates to content presentation.

Advertisers provide advertisements in different forms in order to attract consumers. An advertisement ("ad") is a piece of information designed to be used in whole or part by a user, for example, a particular consumer. Ads can be provided in electronic form. For example, online ads can be provided as banner ads on a web page, as ads presented with search results, or as ads presented in a mobile application.

One can refer to the inclusion of an ad in a medium, e.g., a webpage or a mobile application, as an impression. An advertising system can include an ad in a webpage, for example, in response to one or more keywords in a user search query input to a search engine. If a user selects the presented ad (e.g., by "clicking" the ad), then the user is generally taken to another location associated with the ad, for example, to another, particular web page.

SUMMARY

This specification describes technologies relating to content presentation. In general, one aspect of the subject matter described in this specification can be embodied in methods that include the actions of determining a location history for a user, where the location history includes a plurality of location data points for the user; analyzing the location history to derive a category for the user; associating the user with the category; and using the user's associated category to boost one or more candidate content items for delivery to the user. Other embodiments of this aspect include corresponding system, apparatus, and computer program products.

These and other embodiments can optionally include one or more of the following features. The candidate content items can be advertisements. Determining the location history can include: for each location of a plurality of locations, receiving location information from the user; and analyzing the location information to determine the plurality of location data points. The location information can include one or more of: global positioning system (GPS) coordinates from a mobile device, an internet protocol (IP) address, or one or more search queries.

Analyzing the location history can include comparing the location history with one or more other location histories having existing associated categories. Using the user's associated category to boost the one or more candidate content items can include: receiving a request to serve a content item to the user; determining whether any content items of the one or more candidate content items are associated with the user's associated category; and applying a weight to a score for each content item associated with the user's associated category.

Each of the plurality of location data points can be associated with one or more times, and one or more additional categories can be derived for the user for each of the one or more times.

One or more additional location data points can be identified for the user and included in the location history for the user. The location history including the additional location data points can be analyzed to derive a new category for the user. The user can be associated with the new category. The additional location data points can be filtered to determine whether they will influence the user's associated category. One or more further location data points can be periodically identified for the user.

In general, one aspect of the subject matter described in this specification can be embodied in methods that include the actions of receiving a request to serve a content item to a user; determining one or more candidate content items; identifying a category for the user, the category being derived using a location history for the user, the location history including a plurality of location data points for the user; determining whether the category matches the one or more candidate content items; boosting a score of each candidate content item determined to match the category; based on the scores for the candidate content items, selecting a first content item of the one or more candidate content items to serve to the user; and serving the first content item to the user. Other embodiments of this aspect include corresponding system, apparatus, and computer program products.

These and other embodiments can optionally include one or more of the following features. The one or more candidate content items can be advertisements. Each candidate content item can be associated with one or more categories identified using advertiser supplied keywords. Selecting the first content item of the one or more candidate content items can include selecting the content item having the highest score including any boosting.

Particular embodiments of the invention can be implemented to realize one or more of the following advantages. Users can be classified into one or more categories based on location histories of the users. Content items (e.g., ads) can be targeted to a users based on categories assigned to that user. Reports can be provided to advertisers describing user categories that are likely lucrative for a given ad campaign.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 4A shows a diagram of an example location history for an example user.

FIG. 4B shows a diagram of an example location history for an example user.

Like reference numbers and designations in the various drawings indicate like elements.

DETAILED DESCRIPTION

Advertisers seek to have content items (e.g., ads) presented to users likely to be interested in the content items. For example, content items can be targeted to users based on the user's location history and characteristics of the user. In particular, users can be associated with one or more categories indicative of the types or interests of users with related location histories. Content items matched to these categories can be boosted by a system when determining content items to serve to users.

While reference will be made below to advertising systems and processes, other forms of content including other forms of sponsored content can be managed and presented in accordance with the description below.

Figure 1:
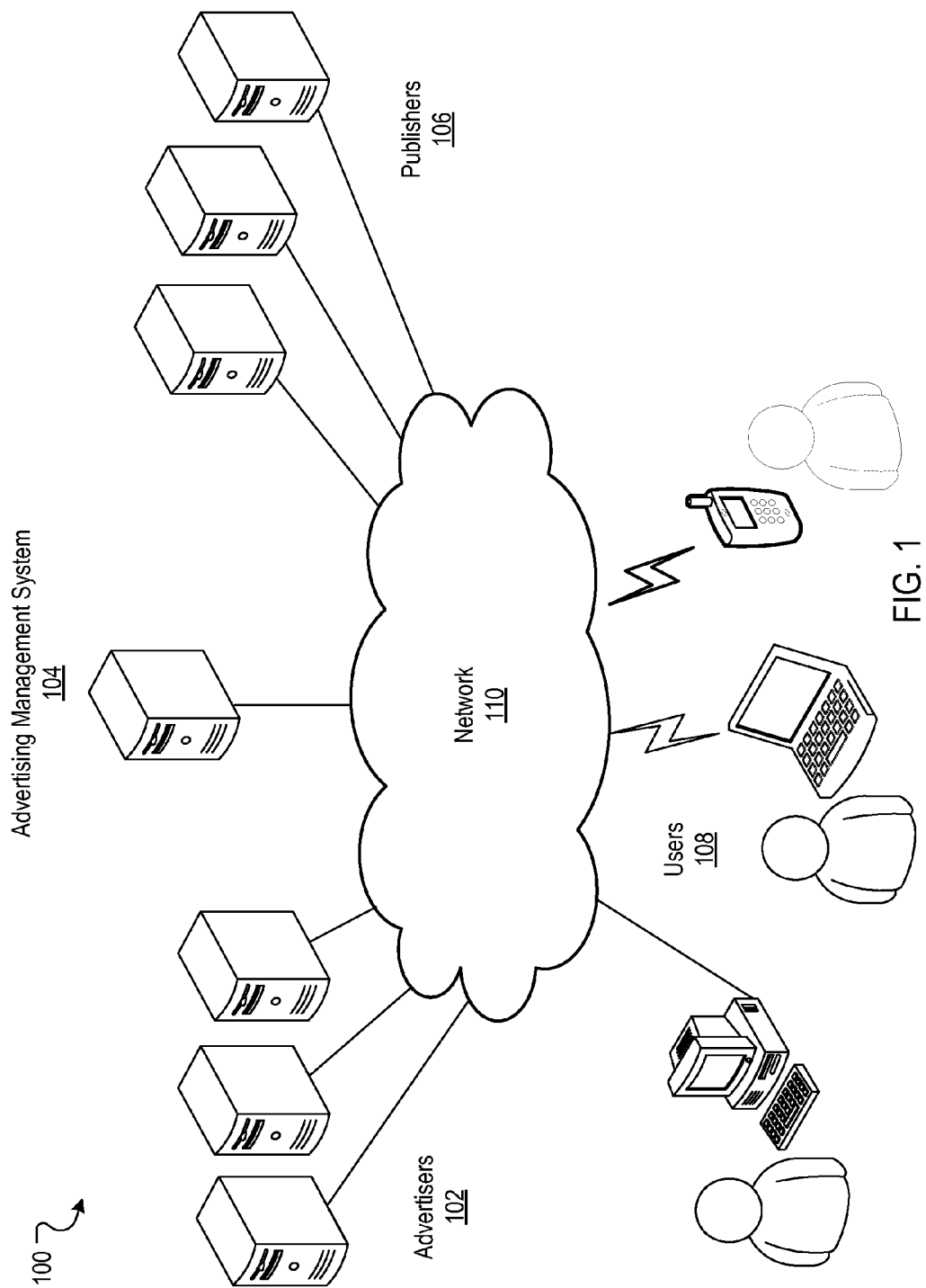
FIG. 1 is a block diagram of an example content presentation system.

FIG. 1 is a block diagram of an example content presentation system 100. In some implementations, one or more advertisers 102 can directly, or indirectly, enter, maintain, and track ad information in an advertising management system 104. Though reference is made to advertising, other forms of content, including other forms of sponsored content, can be delivered by the advertising management system 104. The ads can be in the form of graphical ads, such as banner ads, text only ads, image ads, audio ads, video ads, ads combining one or more of any of such components, and so on. The ads can also include embedded information, such as links, meta-information, and/or machine executable instructions.

One or more publishers 106 can submit requests for ads to the advertising management system 104. The advertising management system 104 responds by sending ads to the requesting publisher 106 for placement on, or association with, one or more of the publisher's content items (e.g., web properties). Example web properties can include web pages, television and radio advertising slots, or print media space.

Other entities, such as users 108 and 110 and advertisers 102, can provide usage information to the advertising management system 104, for example, whether or not a conversion (e.g., a purchase or other interaction) or a click-through related to an ad (e.g., a user has selected an ad) has occurred. This usage information can include measured or observed user behavior related to ads that have been served. In some implementations, the advertising management system 104 performs financial transactions, for example, crediting the publishers 106 and charging the advertisers 102 based on the usage information.

A network 112, such as a local area network (LAN), wide area network (WAN), the Internet, one or more telephony networks or a combination thereof, connects the advertisers 102, the advertising management system 104, the publishers 106, and the users 108 and 110.

One example publisher 106 is a general content server that receives requests for content (e.g., articles, discussion threads, music, video, graphics, search results, web page listings, information feeds, and so on), and retrieves the requested content in response to the request. The content server can submit a request for ads to an advertisement server in the advertising management system 104. The ad request can include a number of ads desired. The ad request can also include content request information. The content request information can include the content itself (e.g., page, video broadcast, radio show, or other type of content), a category corresponding to the content or the content request (e.g., arts, business, computers, arts-movies, arts-music, and so on), part or all of the content request, content age, content type (e.g., text, graphics, video, audio, mixed media, and so on), geo-location information, and so on.

In some implementations, the content server (or a client browser or the like) can combine the requested content with one or more of the ads provided by the advertising management system 104. The combined content and ads can be served (e.g., sent/rendered) to the users 108 that requested the content for presentation in a viewer (e.g., a browser or other content display system). The content server can transmit information about the ads back to the advertisement server, including information describing how, when and/or where the ads are to be rendered (e.g., in hypertext markup language (HTML) or JavaScript™)

Another example publisher 106 is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and can be grouped into a specified number (e.g., ten) of search results.

The search service can submit a request for ads to the advertising management system 104. The request can include a number of ads desired. This number can depend on the search results, the amount of screen or page space occupied by the search results, the size and shape of the ads, and so on. In some implementations, the number of desired ads will be from one to ten, or from three to five. The request for ads can also include the query (as entered or parsed), information based on the query (such as geo-location information, whether the query came from an affiliate and an identifier of such an affiliate), and/or information associated with, or based on, the search results. The information can include, for example, identifiers related to the search results (e.g., document identifiers of "docIDs"), scores related to the search results (e.g., information retrieval ("IR") scores), snippets of text extracted from identified documents (e.g., web pages), full text of identified documents, feature vectors of identified documents, and so on. In some implementations, IR scores can be computed from, for example, dot products of feature vectors corresponding to a query and a document, page rank scores, and/or combinations of IR scores and page rank scores, and so on.

In some implementations, the advertising management system 104 includes an auction process to select ads from the advertisers 102. For example, the advertisers 102 can be permitted to select, or bid, an amount the advertisers are willing to pay for each presentation of or interaction with (e.g., click) of an ad, e.g., a cost-per-click amount an advertiser pays when, for example, a user clicks on an ad. The cost-per-click can include a maximum cost-per-click, e.g., the maximum amount the advertiser is willing to pay for each click of an ad based on a keyword, e.g., a word or words in a query. Other bid types, however, can also be used. Based on these bids, ads can be selected and ranked for presentation.

The search service can combine the search results with one or more of the ads provided by the advertising management system 104. This combined information can then be forwarded to the users 108 and 110 that requested the content. The search results can be maintained as distinct from the ads, so as not to confuse the user between paid ads and presumably neutral search results.

In some implementations, one or more publishers 106 can submit requests for ads to the advertising management system 104. The advertising management system 104 responds by sending ads to the requesting publisher 106 for placement on one or more of the publisher's web properties (e.g., websites and other network-distributed content) that are relevant to the web property. For example, if a publisher 106 publishes a sports-related web site, the advertising management system can provide sports-related ads to the publisher 106. In some implementations, the requests can instead be executed by devices associated with the users 108 and 110, e.g., by the execution of a javascript when the publisher's web page is loading on a client device.

Another example publisher 106 is a mobile application developer. A mobile application is an application specifically designed for operation on a mobile device (e.g., a smartphone). The mobile application can also include ads positioned within the content of the mobile application. The ads can be received from the advertising management system 104 for placement in the mobile application when accessed by a user (e.g., when a particular page of a mobile application is loaded on the mobile device).

In some implementations, the advertising management system 104 provides categories to advertisers 102 as targeting choices to the advertiser's 102 ads. The advertisers 102 can specify that certain ads or groups of ads are to be targeted to users 108 associated with selected categories.

Figure 2A:
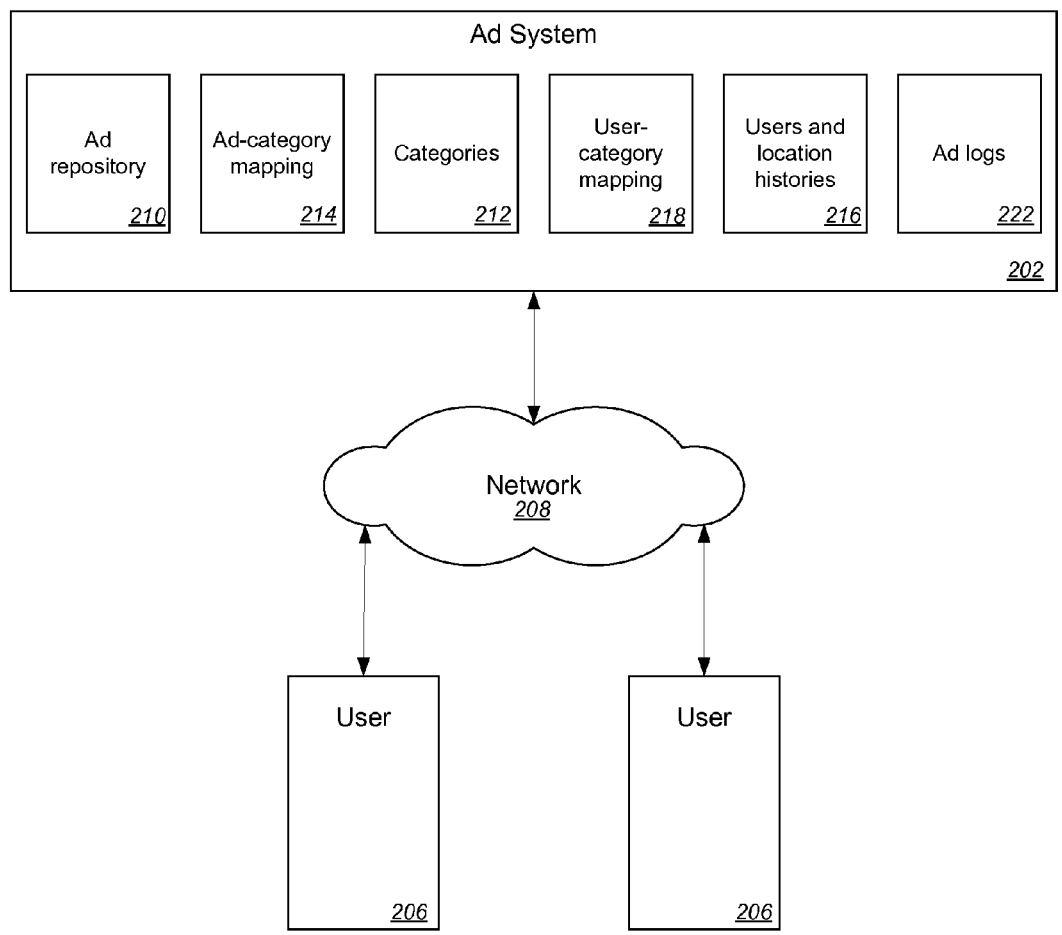
FIG. 2A is a block diagram showing an example ad system and example users.

FIG. 2A is a block diagram showing an example ad system 202 and example users 206. The ad system 202 can interact with users 206 through a network 208. The network 208 can be, for example, a local area network (LAN), a wide area network (WAN), the Internet, one or more telephony networks, cellular networks, or combinations thereof.

The users 206 can receive one or more ads, directly or indirectly, from the ad system 202. Additionally, the users 206 can provide location information to the ad system 202. For example, each user 206 can be associated with a mobile device at a location. The mobile device can provide location information (e.g., global positioning system (GPS) coordinates) to the ad system 202.

Location information for a user can be a geographic place or region and can refer to, for example, GPS coordinates, latitude and longitude, address locations, a region surrounding particular GPS coordinates, and the like. A region can be defined as an area within a particular distance (e.g., one hundred feet) of particular GPS coordinates. As another example, the location can be a semantic location or a region surrounding a semantic location. A semantic location can be, for example, a shopping mall, a park, a landmark, or some other area of interest.

The ad system 202 includes an ad repository 210 and a collection of categories 212 that can be associated with users, ads, or both. The ad system 202 includes an ad-category mapping 214 that specifies which categories are associated with which ads.

In some implementations, the ad system 202 includes records of users and their location histories 216. Example location histories are described in greater detail below with respect to FIGS. 4A and 4B. In those implementations, the ad system 202 includes a user-category mapping 218 that associates each user with one or more categories.

In some implementations, users 206 control whether the ad system 202 includes records of their location histories 216. For example, the users 206 can send preferences information to the ad system 202 indicating that the ad system 202 is or is not to include or track location histories. In some implementations, a user can control the extent to which the ad system 202 maintains that user's location history. For example, the user can set a preference that the ad system 202 is only to keep a certain number of specific locations, or only locations at certain times, or only locations at certain places, and so on. In various implementations, users 206 can access and change their location histories on the ad system 202. For example, the ad system 202 can provide a web page where users can see their location histories and add or delete locations, times associated with locations, and other information.

Ad logs 222 allow the ad system 202 to track ads presented to users 206, conversions associated with the presented ads, and other information. For example, the ad logs 222 can identify particular ads presented to individual users (e.g., impressions). The ad logs can include an ad identifier, a time stamp, a user identifier (e.g., user ID, device ID, etc.), an advertiser identifier, and the like. The ad logs 222 can also include a log of conversions associated with the presented ads (e.g., conversion events associated with particular user actions responsive to a presented ad), categories associated with users 206, and the like.

In some implementations, users' locations are logged anonymously. In some other implementations, information is stored to identify each user. Various techniques can be used to protect users' privacy.

In some implementations, the ad system 202 provides reports to advertisers. For example, the reports can indicate information in the ad logs 222. In some implementations, the reports indicate which user categories are particularly lucrative for a given ad campaign.

Figure 2B:
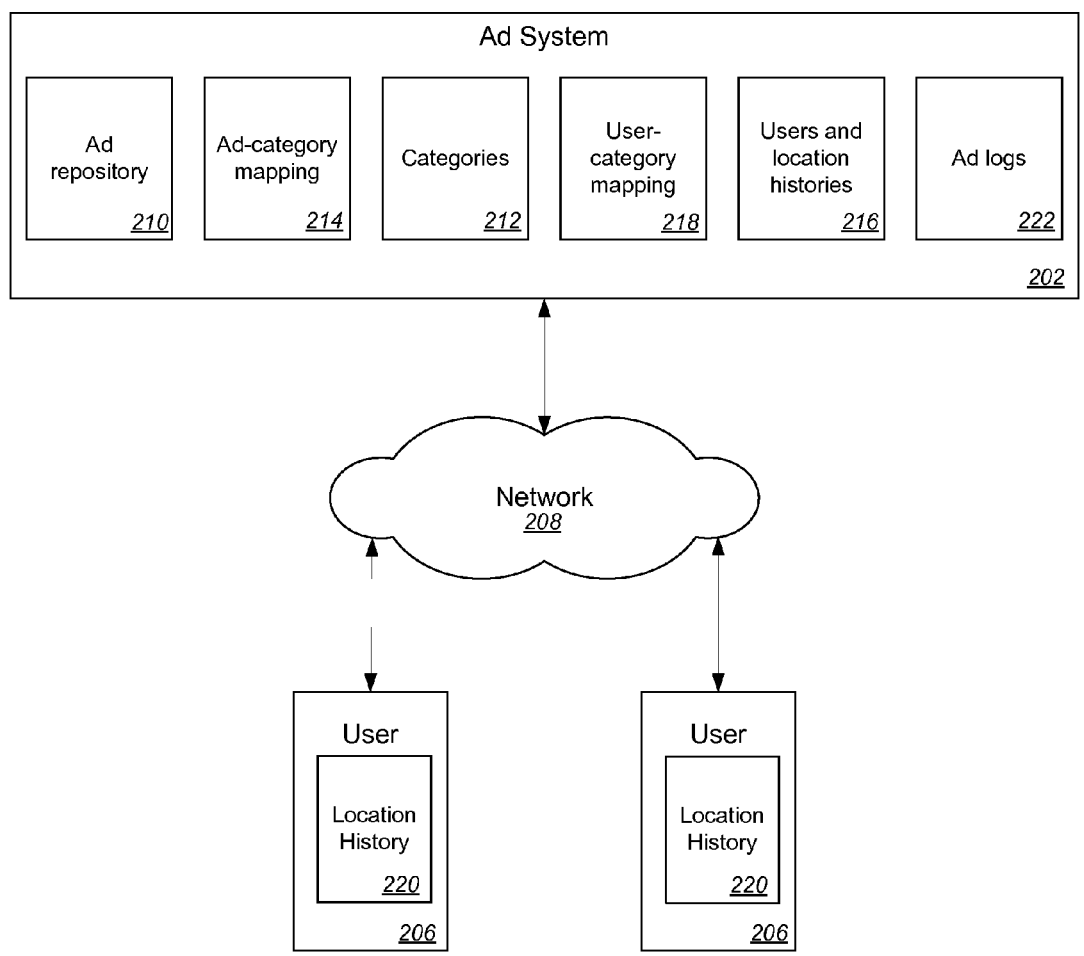
FIG. 2B is a block diagram showing an example ad system and example users where users store location histories.

FIG. 2B is a block diagram showing an example ad system 202 and example users 206 where users 206 store location histories 220.

In some implementations, users maintain their location histories 220 locally, for example, on users' mobile devices. Example location histories are described in greater detail below with respect to FIGS. 4A and 4B. In those implementations, users can store categories they are associated with locally, or the system can include a user-category mapping 218, or both users and the system can store categories.

In some other implementations, some users maintain their location histories locally, and the system 202 includes records of other users (who do not maintain their location histories locally) and their location histories 216. For example, when the system 202 is identifying a user's location history, the system 202 can first check its own records 216 and, if it does not have a record for the user, the system 202 can then poll the user's mobile device for a location history. Various configurations of location histories and user-category mappings are possible.

Figure 3:
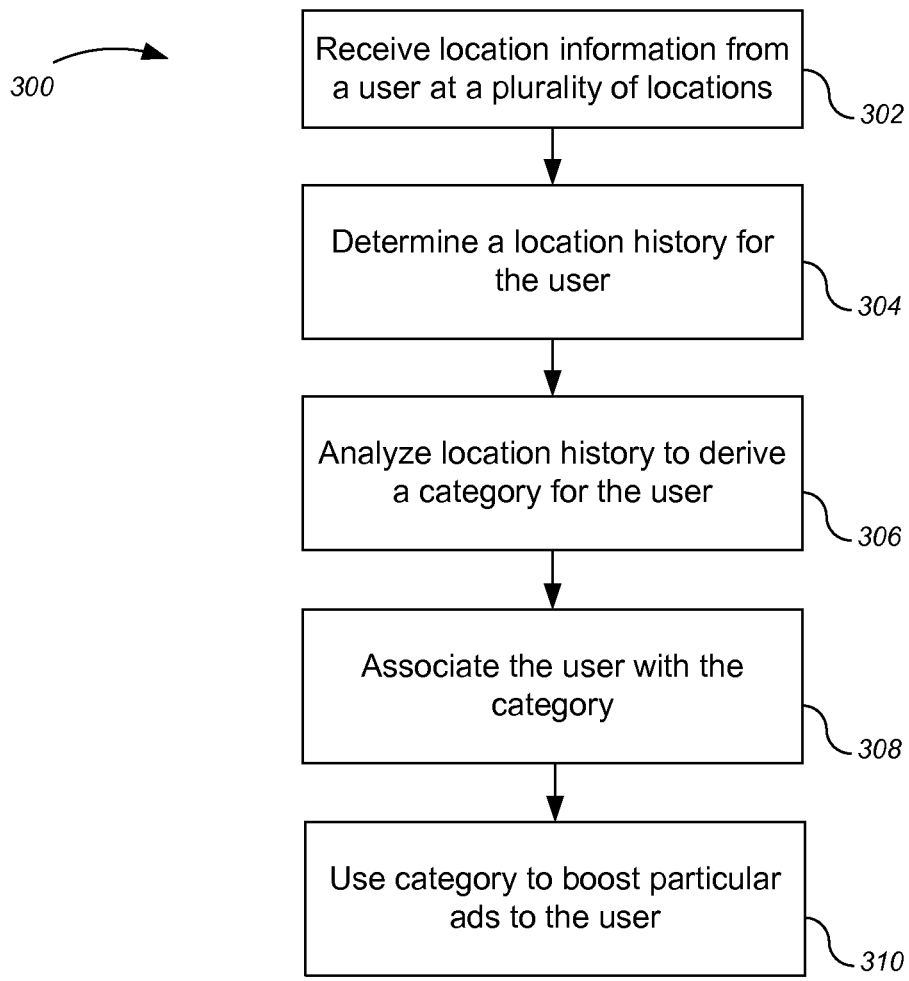
FIG. 3 is a flow chart of an example process for associating a user with a category.

FIG. 3 is a flow chart of an example process 300 for associating a user with a category. In some implementations, the process 300 is performed by a system, e.g., ad system 202 or advertising management system 104.

Location information is received from a user at a plurality of locations (step 302). In some implementations, the explicit location information (e.g., discrete location data or a location history) is received. For example, global positioning system (GPS) coordinates from the user (e.g., the user's mobile device), information from an indoor communication system (e.g., WiFi), information from an indoor positioning system (e.g., based on ultrasound or Bluetooth), or the like. In some other implementations, a location associated with the user is determined based on other available information, for example, using an internet protocol (IP) address, location coordinates from a router for a wireless local area network (LAN), one or more search queries (e.g., from a search service), or the like.

In some implementations, location information is received from the user while the user is located at each location. In some other implementations, location information is received as part of a location history stored on a device associated with the user (e.g., a mobile device). For example, the user's mobile device can store location information for one or more of the user's previous locations and provide that location information (e.g., with a request for a content item).

A location history for the user is determined (step 304). In some implementations, the location history is the location information for the user at one or more locations including, for example, the current location as well as previously visited locations. In some other implementations, the system uses the location information to determine location data points for the user. For example, the system can take location information including several geographic names and convert the location information into latitude and longitude coordinates. The location history for the user can be specified using various formats and various location data points. In some implementations, since not all locations are necessarily associated with a category, the location data is filtered (e.g., by an ad system 202) in order to remove location data that is not associated with a category.

FIG. 4A shows a diagram of an example location history 400 for an example user. In some implementations, the location history 400 is stored as a table. Rows in the table represent location data points.

The first row 402 of the table specifies that the example user's home is located at "Address1." The system determines Address1 using various techniques. For example, the system can use the user's location on nights and weekends or other information (e.g., a user's profile can indicate their home address).

The second row 404 of the table specifies that the example user's work place is located at "Address2." The system determines Address2 using various techniques. For example, the system can use the user's location during working hours (e.g., weekdays between specified hours).

The third row 406 of the table specifies that the example user's vacation home is located at global positioning system (GPS) coordinates "GPS Coords1." To determine the example user's vacation home, the system can, for example, search location information from the user for locations where the user goes once or twice a year for about a week.

The location history 400 can include various other location data points for the example user, using various formats and types of location information (e.g., in the fourth row 408 of the table). For example, the location history 400 can include the location of the restaurant where the user most frequently eats lunch, the location of the user's child's school, the location of the user's gym, and so on. Other types of locations can include particular regions within a city, e.g., a financial district, downtown, a shopping district, and the like.

FIG. 4B shows a diagram of an example location history 420 for an example user. In some implementations, the location history is stored as a table. Rows 422 in the table represent location data points. Each location data point has an associated timestamp 424 (e.g., including time and date) and a location 426 (e.g., specified by latitude and longitude coordinates).

As shown in FIG. 3, the user's location history is analyzed to derive one or more categories for the user (step 306). In some implementations, the system compares the user's location history with one or more other location histories having existing associated categories. For example, if the user's location history is similar to another location history associated with a category, the user's location history can be associated with that category. So a user who goes to ski-slopes every weekend can be associated with a "skier" category, and a user who goes to grocery stores every weekend can be associated with "coupons," for example.

Possible categories can be identified by manual input (e.g., defined by one or more individuals) or according to particular data processing techniques. For example, the categories can be extracted from one or more existing sets of categories or data sets can be processed to derive categories. The categories can be derived by the ad system or can, alternatively, be received from an external source (e.g., an advertiser). Received categories can be filtered to a smaller number of categories according to one or more criteria. Examples of categories include homeowner or renter, income over or under a threshold, spender or saver, conservative or liberal, and so on.

In some implementations, clustering (or cluster analysis) is used to derive categories for the user. For example, in some implementations, the user is associated with a vector of qualities, for instance, location of home, location of vacation, location of ad clicks, commonly frequented locations, time of day for ad conversions, and so on. Other users are also associated with vectors of qualities. Using a function that determines a similarity between two users' vectors, the set of vectors for users can be partitioned into subsets, where the similarity between any two vectors in the subset exceeds the similarity between these vectors and vectors in other subsets. Each subset can be assigned a category, and users whose vectors match the subset can be associated with the category. Various functions for determining a similarity between two vectors are possible, for example, k-neighborhood algorithms, various Bayesian models, and others.

The user is associated with the one or more derived categories (step 308). In some implementations, records of users and their location histories (e.g., users and location histories 216), and mappings between users and categories (e.g., user-category mapping 218) are stored, for example, in the ad system. In some other implementations, the information regarding the derived category is sent to the user (e.g., to the user's mobile device). The information can be stored locally with the user and can be sent back to an ad system, for instance, when the user requests a content item (e.g., a request for an ad for the user can identify the one or more categories associated with the user).

The category is used to boost one or more candidate content items for delivery to the user (step 310). The system boosts candidate content items that match one or more categories associated with the user. Boosting content items using category-location associations is described in greater detail below with respect to FIG. 6.

Figure 5:
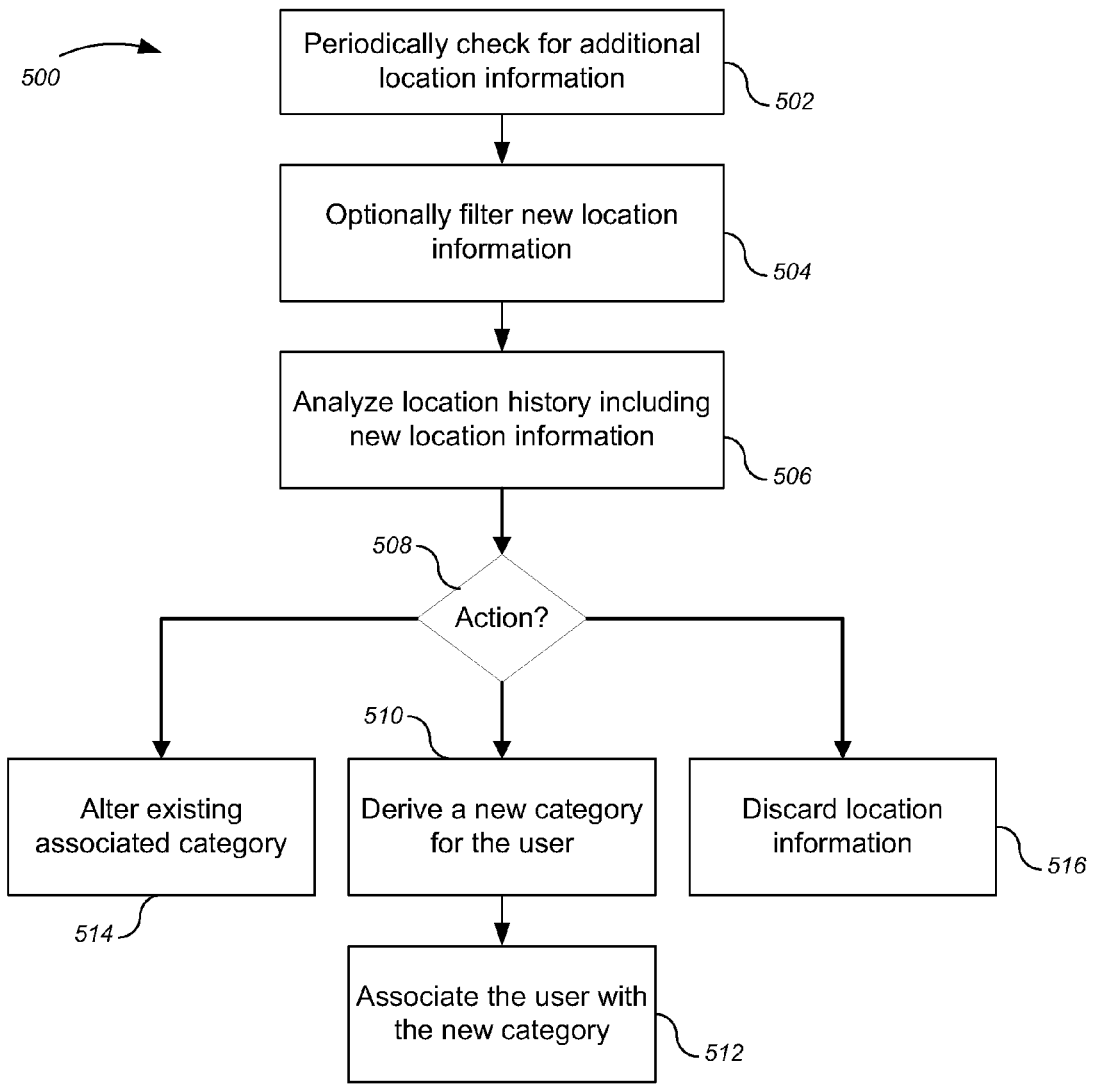
FIG. 5 is a flow chart of an example process for updating a user's location history and associated categories.

FIG. 5 is a flow chart of an example process 500 for updating a user's location history and associated categories. In some implementations, the process 500 is performed by a system (e.g., ad system 202 or advertising management system 104).

Additional location information is periodically checked for (step 502). In some implementations, the user is polled (e.g., the user's mobile device) for additional location information. In some other implementations, a publisher (e.g., publisher 106) or other entity is polled.

The additional location information is optionally filtered (step 504). An attempt is made to determine whether the additional information will influence a user's existing category or permit derivation of a new category for the user. If the additional information will not influence whether the user is associated with any categories, the additional location information can be discarded (and not included in the user's location history). For example, if the user's home address is known, then additional data indicating that the user is at the home address on a weekend will not influence any categories for the user. In another example, some locations can be associated with no categories; such locations can be filtered from further consideration.

The location history, including the new location information, is analyzed (step 506). Three possible actions are taken based on the analysis (step 508).

An attempt is made to derive a new category for the user, and if possible, a new category is derived (step 510). The user is associated with the new category (in some implementations, in addition to any other categories that the user is already associated with) (step 512).

If the location history including the new location information is inconsistent with a category already associated with the user, the existing associated category is altered (step 514). For example, a category can be changed based on new information (e.g., when a user goes from a renter to a homeowner) or to correct a previous mistake.

In some implementations, if the additional location is not used for altering an existing category or deriving a new category, the additional location information is discarded (step 516).

Figure 6:
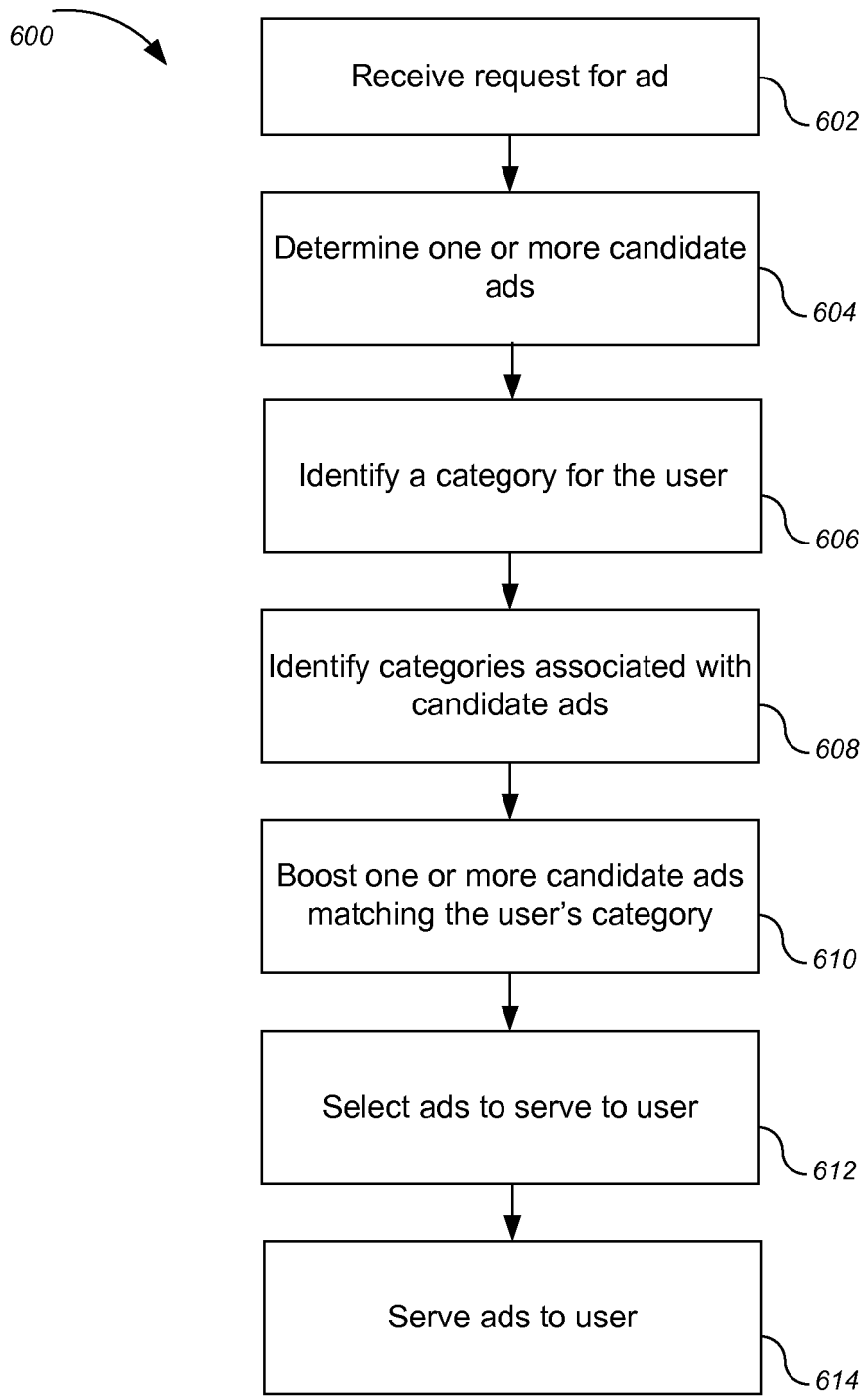
FIG. 6 is a flow chart of an example process for serving an ad to a user.

FIG. 6 is a flow chart of an example process 600 for serving an ad to a user. In some implementations, the process 600 is performed by a system (e.g., ad system 202 or advertising management system 104).

A request for an ad for a user is received (step 602). The request is received from, for example, a publisher (e.g., a publisher 106) or directly from the user.

One or more candidate ads are determined (step 604). Various techniques and information can be used to identify candidate ads. For example, user information (profile, demographics, location generally), publisher content, and the like can be used. In another example, ads can be associated with particular keywords that can be matched to other content (e.g., search query terms, web page text). In some implementations, advertisers specify that certain ads or groups of ads are to be targeted to users associated with certain categories. Additionally, user information (for instance, any categories associated with the user based on the user's location history) can identify likely interests of the user which can be matched to ad keywords.

In some implementations, candidate ads are scored based on various factors including the advertiser's financial agreements with the ad system (e.g., cost per impression), and the degree to which the ad matches the other content. Candidate ads can be ranked in order according to their score.

A category is identified for the user (step 606). For example, the category can be retrieved using a user-category mapping (e.g., user-category mapping 216). The category was derived using a location history for the user, and the location history included location data points for the user. In some implementations, the user's location history and category is stored local to a system performing the process 600 (e.g., ad system 202). In other implementations, the user's location history or category is local to the user, and the user provides it with a request for a content item.

Categories associated with one or more candidate ads are identified (step 608). For example, ads can be selected from an ad repository (e.g., ad repository 210) and categories associated with those ads can be identified using an ad-category mapping (e.g., ad-category mapping 214).

One or more of the candidate ads matching the user's one or more categories are boosted (step 610). Typically, each candidate ad has an associated score. The candidate ads can be ranked in an order defined by the respective scores. The score for the candidate ads matching the one or more categories can be adjusted, increasing the score (e.g., by adding an additional weight to a scoring function or by adding a specified amount or percentage to the score). In some cases, the adjusted score will not change the ranking of a matching candidate ad, depending on the score of the ads above the matching candidate ad in the ranking order. In some implementations, the amount that each candidate ad's score is boosted is variable and can depend on various criteria. For example, candidate ads with closely matching categories can be boosted more than candidate ads with weakly matching categories. In another example, candidate ads having more categories matching categories associated with the user are boosted more than candidate ads having fewer matching categories. In an additional example, some categories are identified as having greater relevance than other categories, and candidate ads matching those categories are boosted a greater amount than other candidate ads.

One or more ads are selected to serve to the user (step 612). In some implementations, the highest ranked candidate ad or ads are selected. The number of candidate ads selected can depend on the number of ads requested. In some cases, the highest ranked candidate ad or ads were not boosted. For example, the difference between two candidate ads in the ranking can be greater than the amount of the change in score from the boosting so that the relative position of the two candidate ads is unchanged. Alternatively, in another example, the change in score from the boosting can cause the score of a boosted candidate ad to be greater than one or more higher ranked ads. In those cases, the ranking can be reordered to position the boosted ad ahead of those candidate ads.

The selected ads are served to the user (step 614). In some implementations, the selected ads are provided directly to the user's device (e.g., for incorporation into content presented on the device). For example, a user's mobile browser can integrate the ads into presented web content. Alternatively, mobile applications can incorporate received ads into the displayed application content. In some other implementations, the ads are sent to a publisher (e.g., publisher 106) for incorporation into content prior to sending the content to the user.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
    determining a location history for a user, wherein the location history includes a plurality of location data points for the user;
    analyzing the location history to derive a category for the user;
    associating the user with the category;
    identifying one or more additional location data points for the user;
    determining whether the one or more additional location data points are already included in the plurality of location data points for the user;
    discarding, in a case where the one or more additional location data points are already included in the plurality of location data points for the user, the one or more additional location data points; and
    using the user's associated category to boost one or more candidate content items for delivery to the user.

2. The method of claim 1, wherein the candidate content items are advertisements.

3. The method of claim 1, wherein determining the location history includes:
    for each location of a plurality of locations, receiving location information from the user; and
    analyzing the location information to determine the plurality of location data points.

4. The method of claim 3, wherein the location information comprises one or more of:
    global positioning system (GPS) coordinates from a mobile device, an internet protocol (IP) address, or one or more search queries.

5. The method of claim 1, wherein analyzing the location history comprises:
    comparing the location history with one or more other location histories having existing associated categories.

6. The method of claim 1, wherein using the user's associated category to boost the one or more candidate content items comprises:
    receiving a request to serve a content item to the user;
    determining whether any content items of the one or more candidate content items are associated with the user's associated category; and
    applying a weight to a score for each content item associated with the user's associated category.

7. The method of claim 1, further comprising:
    associating each of the plurality of location data points with one or more times; and
    deriving one or more additional categories for the user for each of the one or more times.

8. The method of claim 1, further comprising:
    analyzing, in a case where the one or more additional location data points will affect the user's associated category, the location history and the additional location data points to derive a new category for the user; and
    associating the user with the new category.

9. The method of claim 1, wherein the identifying comprises polling the one or more additional location data points from a mobile device or a publisher associated with the user.

10. The method of claim 8, further comprising:
    periodically identifying one or more further location data points for the user.

11. A method performed by a data processing apparatus, the method comprising:
    receiving a request to serve a content item to a user;
    determining one or more candidate content items;
    identifying a category for the user, the category being derived using a location history for the user, the location history including a plurality of location data points for the user, the location history not including one or more additional location data points for the user based on a determination that the one or more additional location data points are already included in the plurality of location data points for the user;
    determining whether the category matches the one or more candidate content items;
    boosting a score of each candidate content item determined to match the category; and
    based on the scores for the candidate content items, selecting a first content item of the one or more candidate content items to serve to the user; and
    serving the first content item to the user.

12. The method of claim 11, wherein the one or more candidate content items are advertisements.

13. The method of claim 11, wherein each candidate content item is associated with one or more categories identified using advertiser supplied keywords.

14. The method of claim 11, wherein selecting the first content item of the one or more candidate content items includes selecting the content item having the highest score including any boosting.

15. A computer storage medium encoded with a computer program, the program comprising instructions that when executed by data processing apparatus cause the data processing apparatus to perform operations comprising:
    determining a location history for a user, wherein the location history includes a plurality of location data points for the user;
    analyzing the location history to derive a category for the user;
    associating the user with the category;
    identifying one or more additional location data points for the user;
    determining whether the one or more additional location data points are already included in the plurality of location data points for the user;
    discarding, in a case where the one or more additional location data points are already included in the plurality of location data points for the user, the one or more additional location data points; and
    using the user's associated category to boost one or more candidate content items for delivery to the user.

16. The computer storage medium of claim 15, wherein the candidate content items are advertisements.

17. The computer storage medium of claim 15, wherein determining the location history includes:
    for each location of a plurality of locations, receiving location information from the user; and
    analyzing the location information to determine the plurality of location data points.

18. The computer storage medium of claim 17, wherein the location information comprises one or more of: global positioning system (GPS) coordinates from a mobile device, an internet protocol (IP) address, or one or more search queries.

19. The computer storage medium of claim 15, wherein analyzing the location history comprises:
comparing the location history with one or more other location histories having existing associated categories.

20. The computer storage medium of claim 15, wherein using the user's associated category to boost the one or more candidate content items comprises:
receiving a request to serve a content item to the user;
determining whether any content items of the one or more candidate content items are associated with the user's associated category; and
applying a weight to a score for each content item associated with the user's associated category.

21. The computer storage medium of claim 15, the operations further comprising:
associating each of the plurality of location data points with one or more times; and
deriving one or more additional categories for the user for each of the one or more times.

22. The computer storage medium of claim 15, the operations further comprising:
analyzing, in a case where the one or more additional location data points will affect the user's associated category, the location history and the additional location data points to derive a new category for the user; and
associating the user with the new category.

23. The computer storage medium of claim 15, wherein the identifying comprises polling the one or more additional location data points from a mobile device or a publisher associated with the user.

24. The computer storage medium of claim 22, the operations further comprising:
periodically identifying one or more further location data points for the user.

25. A computer storage medium encoded with a computer program, the program comprising instructions that when executed by data processing apparatus cause the data processing apparatus to perform operations comprising:
receiving a request to serve a content item to a user;
determining one or more candidate content items;
identifying a category for the user, the category being derived using a location history for the user, the location history including a plurality of location data points for the user, the location history not including one or more additional location data points for the user based on a determination that the one or more additional location data points are already included in the plurality of location data points for the user;
determining whether the category matches the one or more candidate content items;
boosting a score of each candidate content item determined to match the category; and
based on the scores for the candidate content items, selecting a first content item of the one or more candidate content items to serve to the user; and
serving the first content item to the user.

26. The computer storage medium of claim 25, wherein the one or more candidate content items are advertisements.

27. The computer storage medium of claim 25, wherein each candidate content item is associated with one or more categories identified using advertiser supplied keywords.

28. The computer storage medium of claim 25, wherein selecting the first content item of the one or more candidate content items includes selecting the content item having the highest score including any boosting.

29. A system comprising a processor and a memory configured to interact to perform operations including:
determining a location history for a user, wherein the location history includes a plurality of location data points for the user;
analyzing the location history to derive a category for the user;
associating the user with the category;
identifying one or more additional location data points for the user;
determining whether the one or more additional location data points are already included in the plurality of location data points for the user;
discarding, in a case where the one or more additional location data points are already included in the plurality of location data points for the user, the one or more additional location data points; and
using the user's associated category to boost one or more candidate content items for delivery to the user.

30. The system of claim 29, wherein the candidate content items are advertisements.

31. The system of claim 29, wherein determining the location history includes:
for each location of a plurality of locations, receiving location information from the user; and
analyzing the location information to determine the plurality of location data points.

32. The system of claim 31, wherein the location information comprises one or more of:
global positioning system (GPS) coordinates from a mobile device, an internet protocol (IP) address, or one or more search queries.

33. The system of claim 29, wherein analyzing the location history comprises:
comparing the location history with one or more other location histories having existing associated categories.

34. The system of claim 29, wherein using the user's associated category to boost the one or more candidate content items comprises:
receiving a request to serve a content item to the user;
determining whether any content items of the one or more candidate content items are associated with the user's associated category; and
applying a weight to a score for each content item associated with the user's associated category.

35. The system of claim 29, the operations further comprising:
associating each of the plurality of location data points with one or more times; and
deriving one or more additional categories for the user for each of the one or more times.

36. The system of claim 29, the operations further comprising:
analyzing, in a case where the one or more additional location data points will affect the user's associated category, the location history and the additional location data points to derive a new category for the user; and
associating the user with the new category.

37. The system of claim 29, wherein the identifying comprises polling the one or more additional location data points from a mobile device or a publisher associated with the user.

38. The system of claim 36, the operations further comprising:
periodically identifying one or more further location data points for the user.

39. A system comprising a processor and a memory configured to interact to perform operations including:

receiving a request to serve a content item to a user;

determining one or more candidate content items;

identifying a category for the user, the category being derived using a location history for the user, the location history including a plurality of location data points for the user, the location history not including one or more additional location data points for the user based on a determination that the one or more additional location data points are already included in the plurality of location data points for the user;

determining whether the category matches the one or more candidate content items;

boosting a score of each candidate content item determined to match the category; and based on the scores for the candidate content items, selecting a first content item of the one or more candidate content items to serve to the user; and serving the first content item to the user.

40. The system of claim 39, wherein the one or more candidate content items are advertisements.

41. The system of claim 39, wherein each candidate content item is associated with one or more categories identified using advertiser supplied keywords.

42. The system of claim 39, wherein selecting the first content item of the one or more candidate content items includes selecting the content item having the highest score including any boosting.

43. The method of claim 1, wherein the discarding the one or more additional location data points comprises refraining from including the one or more additional location data points in the location history.

* * * * *